United States Patent [19]

Kopacz et al.

[11] 4,278,488

[45] Jul. 14, 1981

[54] TAPE DELIVERY SYSTEM

[75] Inventors: Thomas J. Kopacz, Omro; Charles J. Jacoby, Appleton, both of Wis.

[73] Assignee: Kimberly-Clark Corporation, Neenah, Wis.

[21] Appl. No.: 80,881

[22] Filed: Oct. 1, 1979

[51] Int. Cl.³ .................. B26D 5/20; B32B 31/10; B32B 31/18

[52] U.S. Cl. .................. 156/351; 156/202; 156/212; 156/216; 156/353; 156/354; 156/355; 156/464; 156/465; 156/468; 156/552

[58] Field of Search ............ 156/196, 199, 200, 201, 156/202, 204, 212, 214, 216, 459, 461, 464, 465, 468, 475, 477 R, 483, 552, 351, 353, 354, 355

[56] References Cited

U.S. PATENT DOCUMENTS

| | | | |
|---|---|---|---|
| 1,734,287 | 11/1929 | Cornell | 156/202 |
| 2,164,502 | 7/1939 | Candall et al. | 156/464 |
| 2,213,157 | 8/1940 | Brenn | 156/202 |
| 2,293,687 | 8/1942 | Allen | 156/464 |
| 2,469,972 | 5/1949 | Lowry et al. | 156/464 |
| 2,749,966 | 6/1956 | Roetger | 156/464 |
| 3,038,982 | 6/1962 | Ludlow | 156/202 |
| 3,369,950 | 2/1968 | Rosewicz et al. | 156/464 |
| 3,527,631 | 9/1970 | Ryburn | 156/216 |
| 3,925,963 | 12/1975 | Greenawalt | 53/552 |
| 4,106,261 | 8/1978 | Greenawalt | 53/449 |

*Primary Examiner*—Caleb Weston
*Attorney, Agent, or Firm*—Wendell K. Fredericks; William D. Herrick

[57] ABSTRACT

A tape delivery system useful for applying a plastic tape to a sheet of scrim reinforced tube stock is disclosed. Tape forming techniques are employed to shape a length of plastic tape and to apply that tape to a bottom margin region of the tube stock material to form a scrim reinforced open-mouth container bag.

4 Claims, 4 Drawing Figures

TAPE DELIVERY SYSTEM

BACKGROUND OF THE INVENTION

1. Field of the Invention

This invention relates to heat sealing techniques for effecting high volume sealing of scrim material and more particularly, in a preferred embodiment, to apparatus and methods for applying a thermoplastic tape to a bottom margin of a length of scrim reinforced tube stock material so that the tape is fused equally about a bottom edge of the tube stock.

2. Description of the Prior Art

In prior art tape delivery systems, it is well known to use tape forming techniques to prepare the shape of strips of thermoplastic tape for application to a bottom margin region of a length of tube stock or a blank of material during the fabrication of an open-mouth container bag. Various forming devices arrangements and mechanical motion strategies and combinations thereof, have been employed to develop efficient automatic, production line tape seal delivery systems to effect proper tape seals.

Most prior art tape delivery systems have been employed to weld thermoplastic films. Such a delivery system is described in U.S. Pat. No. 2,469,972 issued May 10, 1949 to Lowry et al. There a system is described which is capable of providing effective welds of thermoplastic tape along a bottom edge of thermoplastic tube stock, but, however, the structural arrangement of the component parts of the system and the tolerances thereof are not suited for application of thermoplastic tape to very thin and flexible thermoplastic material. Another method for automatic fabrication of bags is described in U.S. Pat. No. 4,106,261 issued Aug. 15, 1978 to Greenawalt. There, scrim reinforced web is converted into a tube and then the tube is fabricated into a plastic bag structure. The bottom and top ends of the bag structures are heat sealed after filling the container with a product. The fabrication of bags as disclosed in this patent appear to require tight control over the products that are placed in each bag; also an overlap seal of the marginal ends as described therein would not provide the strength and dimensional stability in both the warp and fill direction of the material to provide an effective bottom seal for an open-mouth bag.

It should be recognized that in fabricating open-mouth scrim reinforced bags of the type wherein the bottom margin of the scrim reinforced tube stock is sealed, the use of overlap sealing techniques would be impractical. Material structure of the plies of plastic would not permit sufficient adhesion to support the product load weights illustratively of 30–40 pounds.

SUMMARY

The present invention relates to a method and apparatus for tape sealing a bottom margin region of a length of extremely flexible and somewhat flimsy tube stock to form an open-mouth plastic bag. The tape, which is a thermoplastic material, is formed and guided so that the inner contour of the tape is deposited equally about this bottom edge upon the bottom margin region of the tube stock. The method comprises the step of shaping a length of tape about a longitudinal length of tube stock so that the inner contour surfaces of the tape cover equally the outer surface of marginal regions that are adjacent to the bottom edge of the tube stock. The shaped tape is applied about the bottom margin region of the tube stock such that the bottom edge of the tube stock is in line with the longitudinal axis of the tape. Then the tape while in this position is fused by direct application of heat to form a tape sealed bottom to an open-mouth scrim reinforced plastic bag.

To practice the above method, an improved tape delivery system is provided for welding a plurality of length of tube stock supplied from a carrier unit. The apparatus includes a supply wheel, a tape accumulator, a vertical guide section, and a tape application unit. The apparatus further comprises the tape forming means for shaping a length of tape about a longitudinal axis of the tape so that inner contour surface of the tape can be applied equally to the outer surface bottom margin regions that are adjacent to the bottom edge of the tube stock.

DESCRIPTION OF THE PREFERRED EMBODIMENT

Figure 1:
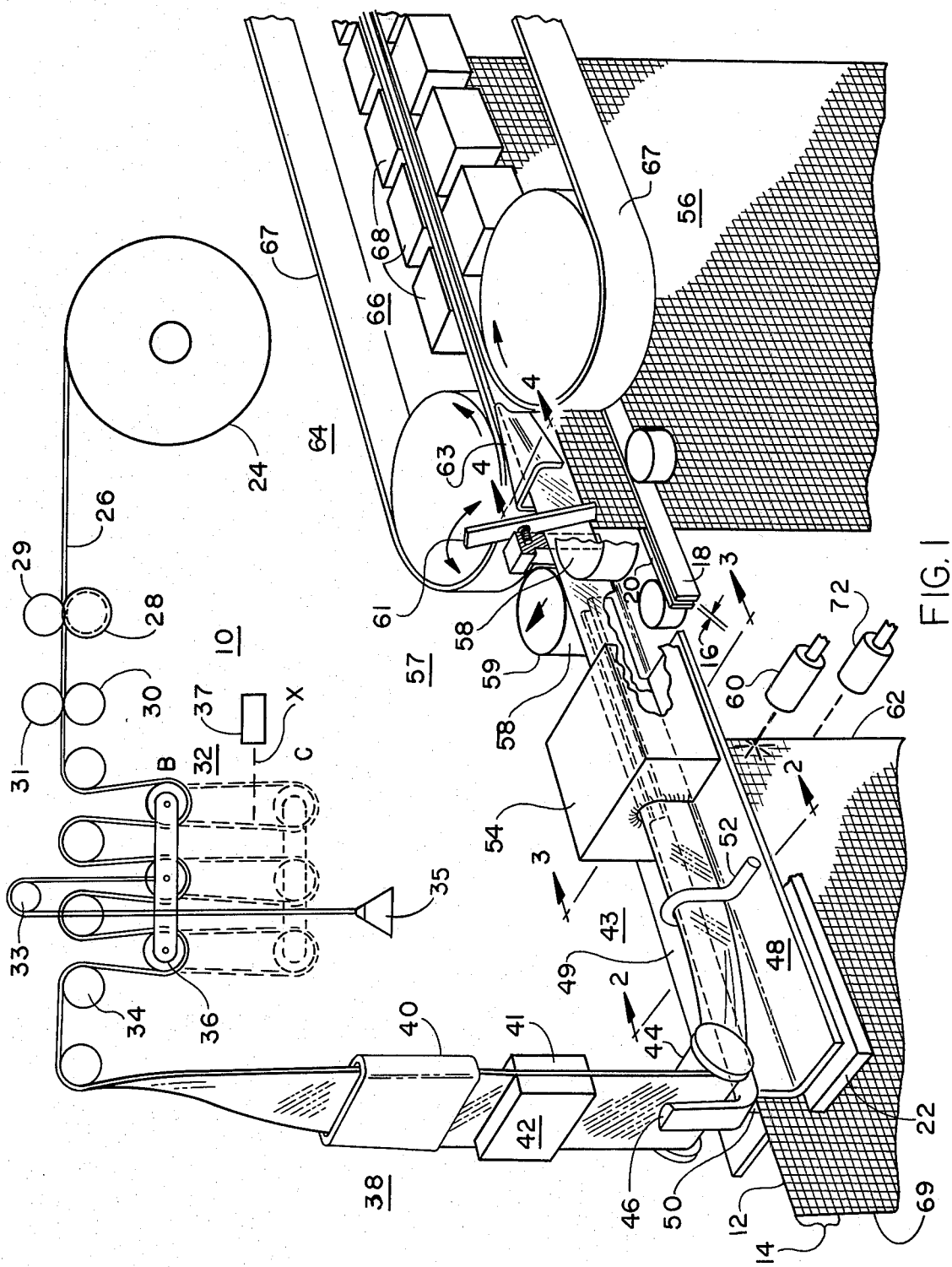
FIG. 1 is a combination of a plane view and a perspective view of a preferred embodiment of the invention.

Referring to the drawing figures, there is shown in FIG. 1 a preferred embodiment of a tape delivery system 10 for fabricating scrim reinforced plastic bags from a length of scrim reinforced tube stock. Illustratively, each length of tube stock comprises a composite web formed by encapsulating a scrim ply between at least two plies of a plastic film. The web is converted into a tube having an overlap seam. The overlap seam is heat sealed to form the tube stock. The stock is then cut to a desired length, for example, 36 inches. The scrim material utilized in this web is formed from illustratively 9 threads per inch × 5 threads per inch 50 denier nylon yarn; while the plastic film plies are ¼ to ½ mil.

Each length of tube stock 12 of FIG. 1 is fed into the delivery system 10 from a transfer carrier (not shown). A marginal region 14 of the tube stock is received in a horizontal width cavity 16 formed between a pair of horizontally disposed endless transfer belts 18 and 20 of the delivery system. Belts 18 and 20 are used to grasp, hold, and transfer the tube stock during the entire tape sealing process. Belts 18 and 20 and the associated belt drive system (not shown) are mounted on a frame member 22.

A clutch control tape wheel 24 (clutch not shown), containing a reel of tape 26 of, for example 1⅛ inch wide polyethylene, 1 mil thick ribbon, is used to supply the tape which is fused about a bottom edge 27 (best seen in FIG. 4) of the tube stock 12. Tape 26 from wheel 24 is passed through primary tape feed wheels 28 and 29 and through guide rollers 30 and 31 to an accumulator 32. Accumulator 32 comprising of a plurality of fixed rollers 34—34, a plurality of moveable rollers wheels 36—36 that are suspended from a counter-balance weight and pulley system 33, and a first electric eye system unit 37 provides a prescribed length of tape to a vertical guide section 38 of the delivery system. Tape 26 is routed alternatively over a fixed and then a moveable roller of the accumulator 32. Tape feed nip wheels 28 and 29 which are motor driven, feed a length of tape into the accumulator 32 from the tape supply wheel 24 when the moveable rollers 36—36 are moved by a counter-balance weight 35 of the weight and pulley system 33 between the space above the line of sight (x) of the electric eye unit 37 and the fixed rollers 34—34. When the moveable rollers move through the line of sight (x) of the electric eye 37, the clutch associated with the tape wheel 24 is engaged which, in turn, disengages wheel 24 from a drive motor (not shown).

The tape 26 is further passed through the vertical guide section 38 which comprises a tape guide 40 and a pair of tape drag pads 41 and 42. Tape guide 40 which is mounted to a frame member is used to place the tape 26 in line with a tape guide spool 44 of a tape forming unit 43. Tape drag pads 41 and 42 are used to remove any particles and/or debris collected on tape 26 as it travels between tape wheel 24 and tape forming unit 43.

The tape forming unit 43 includes a tape guide spool 44, a primary tape forming rod 46, a first L-shaped tape guide plate 48, a second L-shaped guide plate 49, a tape forming wire 52 and a tape forming block 54. Tape 26 is passed under tape guide spool 44 and over primary tape forming rod 46. Rod 46 has one end bent to be vertical and in-line with the path of tape 26 as the tape leaves tape drag pads 41 and 42.

Tape guide spool 44 mounted to a spool adjustment block (not shown) disposed on the frame structure, is used to adjust the tension of the tape coming to the tape forming unit 43 from the accumulator 32. Primary tape forming rod 46 is disposed on a top edge surface of the tape guide plates 48 and 49. Plates 48 and 49 contain a horizontal space cavity 50 for receiving bottom margin region 14 of the tube stock 12. Region 14 is the portion of the tube stock containing the bottom edge 27 about which tape 26 is applied to form a container bag 56. The primary tape forming rod 46 along with a tape forming wire 52 and a tape forming block 54 through which the tape passes are used to shape tape 26 before the tape is applied to the bottom margin region of the tube stock. Rod 46 is also used to maintain tape 26 spacially separated from edge 27 as both the tape 26 and tube stock 12 are moved passed the tape guide plates.

Tape 26 leaves the tape forming unit 43 and enters the tape application unit 57. Tape application unit 57 includes tape feed nip wheels 58 and 59, a second electric eye unit 60, a cutoff knife 61, adjustable tape guide wedge 63, and a sealer mechanism 64. Sealer mechanism 64 contains a heating section 66 and a cooling section (not illustrated).

Tape 26 is passed between the tape feed nip wheels 58 and 59 which frictionally grabs tape 26 and drags the prescribed length of tape stored in accumulator 32 into the tape application unit 57. To synchronize movement of tape 26 with movement of tube stock 12, the second electric eye 60 is disposed near the leading edge of tape forming block 54 to detect the passage of a leading edge 62 to the tube stock 12. When the leading edge of the tube stock is detected a control signal from electric eye unit 60 is coupled to the tape nip feed wheels 58 and 59 (the drive system for the wheels are not shown) which then rotate so as to draw the tape 26 from the accumulator 32 through tape guide wedge 63 in a manner that causes the shaped tape leaving the tape forming block to mate with the bottom edge margin region of the tube stock. The tube stock 12 and the tape 26 enter the tape application unit 57 simultaneously. An adjustable tape guide wedge 63 forces the formed tape 26 against the bottom edge of the tube stock as the tape and tube stock travels to the sealer mechanism 64. The heater section 66 applies heat to the composite structure, fusing the tape to the bottom margin. Heating coil 68 disposed along an endless belt 67 are used to generate the required heat to seal the bottom margin. Then the fused region is transferred to the cooling section where the temperature of the region is brought back to room temperature.

As the trailing edge 69 of the tube stock leaves the tape forming unit 43, a third electric eye unit 72 initiates a control signal that activates a cutoff knife 61 which cuts the tape near the trailing edge of the tube stock.

The operation of the delivery system 10 will now be discussed. Lengths of tube stock 12 are continuously fed to the delivery system at a rate of approximately one bag every ½ second, with about ½ bag space interval between each bag.

Tape 26 is initially threaded by hand from tape wheel 24 to the tape feed nip wheels 58 and 59. A suitable length of tape 26 sufficient for sealing the bottom edge of the tube stock 12 is stored in accumulator 32 when counterweight 35 freely descends causing the moveable rollers to travel from a rest position B near the fixed rollers 34 through the line of sight (x) of the first electric eye unit 37 to a loaded position C. As the stored length of tape is fed to the application unit 57, used, and then cut off by cutoff knife 61 during fabrication of each bag, the first electric eye unit senses the lack of tape in the accumulator when rollers 36—36 move from the loaded position C passed the electric eye unit 37 to rest position B. The clutch associated with tape wheel 24 is activated to cause additional tape to be fed into the accumulator. When rollers 36—36 again pass through the electric eye unit 37 towards load position C the clutch disengages stopping the supply of tape to the accumulator.

When the second electric eye unit 60 detects the leading edge of the tube stock 12, the secondary tape feed wheels 58 and 59 are activated to pull the desired length of tape from accumulator 32 for sealing the bottom margin of tube stock 12.

Figure 2:
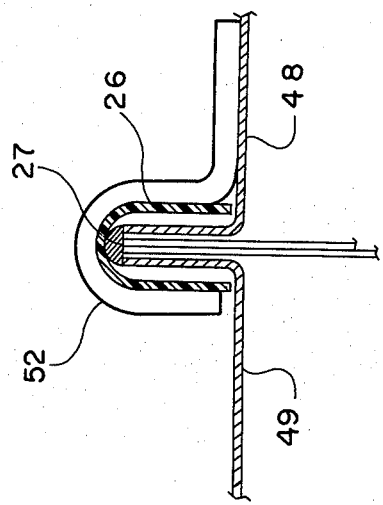

As the desired length of tape is removed from the accumulator by the tape feed nip wheels 58 and 59, the inner contour surface of tape is shaped gradually about a longitudinal axis of the tape as the tape passes over the primary tape forming rod 46 and through the tape forming wire 52 as best seen in FIG. 2. The tape forming rod is preferably a ½ round rod.

Figure 3:
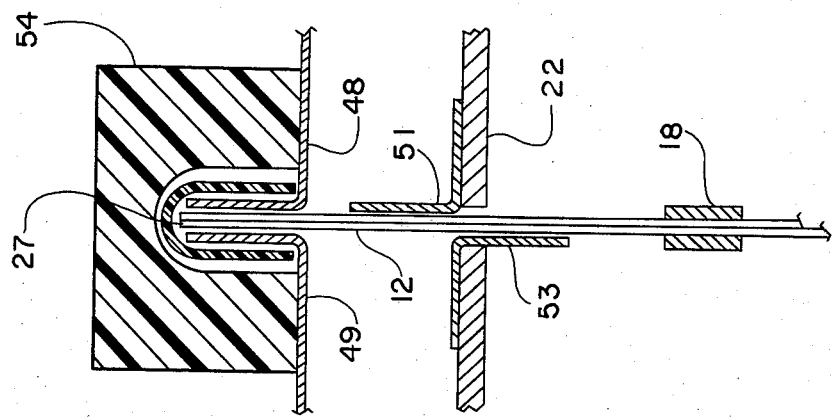

As the tape passes through the forming wire 52 and enters the tape forming block 54 as shown in FIG. 3 the tape is formed about but spaced apart from the bottom marginal region of tube stock 12 and maintained in this configuration as the tube stock is moved towards the tape application region between guide plates 51 and 53. The tight control of the tape with respect to the bottom edge 27 and marginal region 14 of the tube stock is necessary to effectively effect the application of the tape to the 1-3 mil thick tube stock. If the forming rod 46 and the forming block 54 were not present, uneven applications of the tape would occur since such tube stock structure as is utilized to form container bag 56 of this invention is extremely flexible and somewhat flimsy. The primary tape forming rod 46 also provides mechanical assistance in removing any undesirable creasing and folding of the tape prior to the mating of the tape to the bottom margin region of the tube stock.

Figure 4:
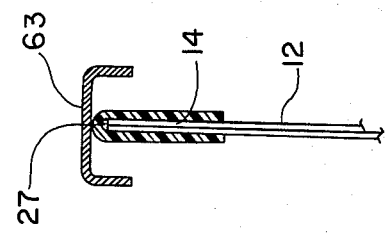
FIGS. 2, 3, and 4 are cross-sectional views of FIG. 1 along the lines 2—2, 3—3, and 4—4 respectively.

As the tape and tube stock enters the tape application section, the adjustable tape guide wedge 63, which has been designed to receive material having horizontal dimensional widths in illustratively the 1-3 mil range, is adjusted to force the tape to fit tightly about the bottom margin region of the tube stock as shown in FIG. 4 so that when the composite structure enters the sealer mechanism 64, the tape will fuse to the margin region equally about the bottom edge 27 of the tube stock.

When the trailing edge of the tube stock is detected by a third electric eye unit 72 two (2) control signals are generated. Firstly, a signal is initiated to deactivate secondary tape feed wheels 58 and 59 stopping the delivery of tape, and secondly, another signal is initiated to activate the cutoff knife 61 which cuts the trailing edge of the tape covering the bottom region at a point just beyond the trailing edge of the tube stock.

The method and apparatus, described above for sealing the bottom region of the tube stock 12 to form the container bag 56 have been specifically developed for fabricating scrim reinforced bags utilizing scrim material of the class described supra. By employing this method, scrim reinforced container bags weighing from 1 to 3 ounces may be formed. But, however, the principles of the invention may be applied to the formation of bags employing much heavier materials. It is to be understood that the above-described embodiments are mainly illustrative of the principles of the invention. One skilled in the art may make changes and modifications to the embodiments disclosed herein and may devise other embodiments without departing from the scope and essential characteristics thereof.

We claim:

1. A tape delivery system for use in forming a plurality of extremely flexible and somewhat flimsy plastic bags from sequentially provided lengths of plastic tube stock and plastic tape; wherein a tube stock source supplies a predetermined length of tube stock systematically and in consecutive order to said tape delivery system; and wherein an initial length of tape is threaded through said tape delivery system to initiate the bag forming operation, said system comprising:
   (a) a tape supply source;
   (b) a tape accumulator for accumulating sequentially a predetermined length of tape from said supply source, said accumulator including tension control means for controlling the tension of the tape so as to prevent tape stretching and tape overrun;
   (c) vertical guide means disposed to receive each length of tape from said accumulator during the advancement of the tape, said vertical guide means providing means for the removal of particles and/or debris collected on the tape;
   (d) a first electric eye unit disposed to sense tape movement between said tape accumulator and said vertical guide means for generating an electrical signal to said tape supply source to cause another length of tape to be supplied to said accumulator;
   (e) tape forming means for shaping the tape in an inverted U-shape and for aligning a bottom edge of the tube stock along a longitudinal axis of the shaped tape, the shaping and aligning being performed in a manner as to smooth out creases and folds in the tape during advancement of the tube stock, the tape and tube stock being kept spatially separated during the alignment; said tape forming means including, (1) an adjustable tape guide spool disposed between said vertical guide means and said tape forming means for guiding the tape from said vertical guide means to said tape forming means and for adjusting the tension of the tape being advanced; (2) a first L-shaped tape guide plate; (3) a second L-shaped tape guide plate having a leg extending parallel to a leg of said first guide plate and a base extending parallel but opposed to a base of said first guide plate, said second guide plate being spatially separated from said first guide plate providing a guide passage for the bottom margin region of the tube stock as each length of tube stock is advanced through said tape forming mean; (4) a half-round, primary tape forming rod disposed upon a top surface of said first and second tape guide plates, said rod having one end bent to extend vertical and in-line with the path of the tape advancing from said tape guide spool, said rod being used to form the curvature of the tape and to oppose undesirable creasing and folding of the tape during tape transfer; (5) a tape forming wire disposed about said half-round rod for guiding the tape over the rod and against the base and leg of said first and second guide plates; and (6) a tape forming block disposed adjacent to another end of said half-round and about said first and second L-shaped tape guide plates to further shape the tape before the tape is applied to the bottom region of the tube stock; and
   (f) means for applying the tape around the edge of the advancing tube stock which is in alignment with the longitudinal axis of the tape.

2. Apparatus in accordance with claim 1, wherein said tape application means includes:
   (a) a pair of motor driven tape feed nip wheels disposed to frictionally grasp the tape, and drag the tape while pressing the inner contour surfaces of the tape against the bottom margin region of the tube stock;
   (b) a second electric eye unit positioned near a leading edge of said tape forming block to detect the passage of a leading edge of the tube stock for generating a control signal to said pair of tape feed nip wheels to cause said wheels to be driven in such a manner as to synchronize movement of the tape with the movement of the tube stock;
   (c) heat sealing means for fusing the tape to the bottom margin region of the tube stock during advancement of the composite structure of the tape and tube stock from said tape feed nip wheels, sealing the bottom edge;
   (d) an adjustable tape guide wedge disposed between said tape feed nip wheels and said heat sealing means to guide the transfer of the tube stock with the tape pressed against the bottom margin region of the tape;
   (e) a cutoff knife disposed between said tape feed nip wheels and said tape guide wedge for cutting the trailing edge of the tape fused to the tube stock; and
   (f) a third electric eye unit disposed to sense a trailing edge of the tube stock for generating a first and a second control signal, the first signal being used to deactivate said tape feed nip wheels stopping the delivery of the tape from said accumulator and the second signal being used to activate said cutoff knife for cutting the trailing edge of the tape from the formed bag.

3. Apparatus in accordance with claim 2 wherein the tube stock is from 1 to 3 mils thick.

4. Apparatus in accordance with claim 3, wherein the tape is 1⅛ inch wide, 1 mil thick polyethylene ribbon.

* * * * *